US011373049B2

(12) United States Patent
Johnson Premkumar et al.

(10) Patent No.: US 11,373,049 B2
(45) Date of Patent: Jun. 28, 2022

(54) CROSS-LINGUAL CLASSIFICATION USING MULTILINGUAL NEURAL MACHINE TRANSLATION

(71) Applicant: Google LLC, Mountain View, CA (US)

(72) Inventors: Melvin Jose Johnson Premkumar, Sunnyvale, CA (US); Akiko Eriguchi, Shinagawa-ku Tokyo (JP); Orhan Firat, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 319 days.

(21) Appl. No.: 16/610,233

(22) PCT Filed: Aug. 26, 2019

(86) PCT No.: PCT/US2019/048125
§ 371 (c)(1),
(2) Date: Nov. 1, 2019

(87) PCT Pub. No.: WO2020/046807
PCT Pub. Date: Mar. 5, 2020

(65) Prior Publication Data
US 2020/0342182 A1 Oct. 29, 2020

Related U.S. Application Data

(60) Provisional application No. 62/725,245, filed on Aug. 30, 2018.

(51) Int. Cl.
*G06F 40/58* (2020.01)
(52) U.S. Cl.
CPC .................................. *G06F 40/58* (2020.01)

(58) Field of Classification Search
CPC ........ G06F 40/58; G06F 40/263; G06F 40/40; G06F 40/42; G06F 40/44; G06F 40/45
See application file for complete search history.

(56) References Cited

U.S. PATENT DOCUMENTS

2008/0091432 A1* 4/2008 Dalton .................... G10L 15/26
704/275
2015/0310862 A1 10/2015 Dauphin et al.
(Continued)

OTHER PUBLICATIONS

McCann, B. et al., "Learned in Translation: Contextualized Word Vectors;" Cornell University; arXiv.org; arXiv:1708.00107v2; 12 pages; Aug. 1, 2017 (Year: 2017).*
(Continued)

*Primary Examiner* — Richemond Dorvil
*Assistant Examiner* — Alexander G Marlow
(74) *Attorney, Agent, or Firm* — Middleton Reutlinger

(57) ABSTRACT

Training and/or using a multilingual classification neural network model to perform a natural language processing classification task, where the model reuses an encoder portion of a multilingual neural machine translation model. In a variety of implementations, a client device can generate a natural language data stream from a spoken input from a user. The natural language data stream can be applied as input to an encoder portion of the multilingual classification model. The output generated by the encoder portion can be applied as input to a classifier portion of the multilingual classification model. The classifier portion can generate a predicted classification label of the natural language data stream. In many implementations, an output can be generated based on the predicted classification label, and a client device can present the output.

19 Claims, 9 Drawing Sheets

(56) References Cited

U.S. PATENT DOCUMENTS

| | | | |
|---|---|---|---|
| 2017/0060850 A1* | 3/2017 | Lewis | G06F 40/47 |
| 2017/0147910 A1 | 5/2017 | Mao et al. | |
| 2018/0129972 A1 | 5/2018 | Chen et al. | |
| 2018/0349359 A1* | 12/2018 | McCann | G06F 40/47 |

OTHER PUBLICATIONS

C. España-Bonet, Á. C. Varga, A. Barrón-Cedeño and J. van Genabith, "An Empirical Analysis of NMT-Derived Interlingual Embeddings and Their Use in Parallel Sentence Identification," in IEEE Journal of Selected Topics in Signal Processing, vol. 11, No. 8, pp. 1340-1350, Dec. 2017 (Year: 2017).*

Cui, Zhiyong & Ke, Ruimin & Wang, Y.. (2018). Deep Bidirectional and Unidirectional LSTM Recurrent Neural Network for Network-wide Traffic Speed Prediction. (Year: 2018).*

Schwenk, H. et al., "Learning Joint Multilingual Sentence Representations with Neural Machine Translation;" Cornell University; arXiv.org; arXiv:1704.04154v1; 8 pages; Apr. 13, 2017 (Year: 2017).*

Massih-Reza Amini and Cyril Goutte. A Co-classification Approach to Learning from Multilingual Corpora. Machine Learning Journal Springer, 79(1-2):105-121, (Year: 2010).*

Bolin Gao, Lacra Pavel. On the Properties of the Softmax Function with Application in Game Theory and Reinforcement Learning (Year: 2018).*

Zhou, G., Zhu, Z., He, T. et al. Cross-lingual sentiment classification with stacked autoencoders. Knowl Inf Syst 47, 27-44 (2016). https://doi.org/10.1007/s10115-015-0849-0 (Year: 2016).*

McCann, B. et al., "Learned in Translation: Contextualized Word Vectors;" Cornell University; arXiv.org; arXiv:1708.00107v2; 12 pages; Aug. 1, 2017.

Zhou, G. et al., "Cross-lingual sentiment classification with stacked autoencoders;" Knowledge and Information Systems; Springer Verlag; vol. 47, No. 1; 18 pages; Jun. 11, 2015.

Schwenk, H. et al., "Learning Joint Multilingual Sentence Representations with Neural Machine Translation;" Cornell University; arXiv.org; arXiv:1704.04154v1; 8 pages; Apr. 13, 2017.

Eriguchi, A. et al., "Zero-Shot Cross-lingual Classification Using Multilingual Neural Machine Translation;" Cornell University; arXiv.org; arXiv:1809.04686v1; 8 pages; Sep. 12, 2018.

Aghajanyan, A. et al., "Towards Language Agnostic Universal Representations;" Cornell University; arXiv.org; arXiv:1809.08510v1; 10 pages; Sep. 23, 2018.

European Patent Office; International Search Report and Written Opinion of Ser. No. PCT/US2019/048125; 17 pages; dated Dec. 10, 2019.

Johnson, M. et al., "Google's Multilingual Neural Machine Translation System: Enabling Zero-Shot Translation"; Cornel University; arXiv.org, arXiv:1611.04558v1; 16 pages; Nov. 14, 2016.

Shigeto, Y. et al., "Ridge Regression, Hubness, and Zero-Shot Learning"; Cornell University; arXiv.org; arXiv:1507.00825v1; 18 pages; Jul. 3, 2015.

Norouzi, M. et al. "Zero-Shot Learning by Convex Combination of Semantic Embeddings"; Cornell University; arXiv.org; arXiv:1312.5650v3; 9 pages; Mar. 21, 2014.

Chen, Y. et al. "Zero-Shot Learning of Intent Embeddings for Expansion by Convolutional Deep Structured Semantic Models"; 2016 IEEE International Conference on Acoustics, Speech and Signal Processing; DOI: 10.1109/ICASSP.2016.7472838; 5 pages; Mar. 20, 2016.

Ha, T. et al. "Effective Strategies in Zero-Shot Neural Machine Translation"; Cornell University; arXiv.org; arXiv:1711.07893v2; 8 pages; Nov. 22, 2017.

Johnson, M. et al. "Google's Multilingual Neural Machine Translation System: Enabling Zero-Shot Translation"; Cornell University; arXiv.org, arXiv:1611.04558v2; 17 pages; Aug. 21, 2017.

Dinu, G. et al. "Improving Zero-Shot Learning by Mitigating the Hubness Problem"; Cornell University; arXiv.org, arXiv:1412.6568v3; 10 pages; Apr. 15, 2015.

Johnson, M. et al. "Google's Multilingual Neural Machine Translation System: Enabling Zero-Shot Translation" Transactions of the Association for Computational Linguistics, vol. 5, pp. 339-351; Oct. 2017.

* cited by examiner

CROSS-LINGUAL CLASSIFICATION USING MULTILINGUAL NEURAL MACHINE TRANSLATION

BACKGROUND

Machine translation ("MT") can use one or more computing device to translate text, speech, etc. from a first language to a second language. For example, a MT process can substitute words in the first language with corresponding words in the second language. However, simple substitutions of words can generate inaccurate translations because a phrase can have a specific meaning that is different than a literal translation of each word within a phrase. For example, the English phrase "leap year" has a specific meaning (i.e., a year that includes February $28^{th}$) but a word for word substitution can translate "leap year", into the second language, as words that indicate a year that leaps.

Neural machine translation ("NMT") models can use artificial neural networks to predict the likelihood of a sequence of words. In many implementations, NMT models can translate an entire phrase and/or sentence at a time. Translating an entire sentence and/or phrase, rather than individual tokens (i.e., individual, characters, words, etc.) can leverage the overall context of the textual and/or spoken input. NMT models can utilize a variety of neural network learning techniques to perform translation including: feature learning techniques, deep learning techniques, etc.

SUMMARY

Techniques are described herein that enable a multilingual classification neural network model to perform a natural language processing ("NLP") classification task by reusing an encoder portion of a multilingual NMT model to leverage a language agnostic representation parameterized by the encoder portion through learned weights of the encoder portion that are generated through training of the NMT model. NLP tasks generally focus on how computing devices can understand human language (e.g., text, speech, hand motions, etc.) and derive meaning from human language in a useful way.

In a variety of implementations, multilingual classification network models can contain an encoder portion and a classifier portion. The encoder portion of the multilingual classification model can be a reused encoder portion of a trained multilingual NMT model.

Multilingual NMT models, in accordance with various implementations, can be trained to translate between many languages. For example, a multilingual NMT neural network model can include an encoder portion, one or more decoder portion(s), and one or more attention mechanism(s) (i.e., one decoder portion and one corresponding attention mechanism for each language). For example, when training an NMT model to translate between four languages, the NMT model can share an encoder portion between all four languages and have a separate decoder portion and a corresponding attention mechanism for each of the four languages (i.e., four separate decoder portions and four corresponding attention mechanisms).

The encoder portion of the trained multilingual NMT model can be reused, while the decoder portion(s) and attention mechanism(s) can be discarded. Reusing the encoder portion of the trained multilingual NMT network model can enable other network models, such as a multilingual classification model in accordance with many implementations, to leverage a language agnostic representation parameterized by the encoder portion through learned weights of the encoder portion that are generated through training of the NMT model to translate a variety of languages.

In many implementations, the encoder portion of the multilingual classification model can include one or more recurrent network layers. As an illustrative example, an encoder portion can include a bi-directional recurrent network layer and a stack of unidirectional recurrent network layers (e.g., three unidirectional recurrent network layers). The hidden states of the memory units within the last recurrent network layer can form the multilingual classification model encoder output. Recurrent network layers can each include one or more memory units to which input can be sequentially applied and, at each iteration of applied input, the memory unit(s) can be utilized to calculate a new hidden state based on the input of that iteration and based on a current hidden state (that can be based on input(s) of prior iteration(s)). In some implementations, a memory unit can be a long short term memory ("LSTM") unit. In some implementations, additional or alternative memory unit(s) may be utilized such as a gated recurrent unit ("GRU").

Additionally or alternatively, the classifier portion of the multilingual classification model can include network layers to perform pooling (e.g., pooling over time). The classifier portion of the multilingual classification model can process the encoder output and generate a classification label for an NLP task. For example, a classifier portion can include a pre-pooling layer with one or more feed-forward network layers, a pooling layer, and a post-pooling layer with one or more feed-forward network layers. In some implementations, a softmax function can process the post-pooling layer output to generate an NLP classification label for the multilingual classification model.

In a variety of implementations, by reusing the encoder portion of a trained NMT model as the encoder portion of a multilingual classification model, the multilingual classification model can be used to classify received input that is in a particular language, despite no training examples that are in that particular language having been used to train the multilingual classification model (e.g., learned weights of at least the classifier portion may not be based on any training examples that include training example input in the particular language). For example, the encoder portion of a multilingual classification model can be initialized by reusing the encoder portion of an NMT model trained to translate English to French and French to English (i.e., trained to translate two languages). After initialization of the encoder portion, the multilingual classification model can be trained using only English training examples. In a variety of implementations, the multilingual classification model trained using only English training examples can still be utilized to generate accurate classification predictions for a variety of French language inputs, despite not being trained based on training examples with labeled classification predictions for French language training example inputs. This surprising result can be based on the language agnostic representation that is generated using the reused encoder portion of the NMT model, and the incorporation of the encoder portion with the classification portion, according to implementations disclosed herein.

In some examples, reusing the encoder portion of a trained NMT model as the encoder portion of a multilingual classification model may allow the multilingual classification model to be trained to classify received input in a particular language through use of only a few training examples that include training example input in the particular language. For example, a multilingual classification model initialized with an NMT encoder as described above (i.e., trained to translate English to French and French to English), can be trained using mostly English training examples (i.e., those with English language training example input) and a small number of French training examples (i.e., those with French language training example input). In a variety of implementations, a quantity of the French training examples utilized can be less than fifty percent of the English training examples utilized, less than ten percent of the English training examples utilized, less than five percent of the English training examples utilized, etc. In a variety of implementations, the multilingual classification model trained using only a small quantity of French training examples can still be utilized to generate accurate classification predictions for a variety of French language inputs. This surprising result can be based on the language agnostic representation that is generated using the reused encoder portion of the NMT model, and the incorporation of the encoder portion with the classification portion, according to implementations disclosed herein.

In various implementations zero-shot learning or few-shot learning can thus be utilized to train the multilingual classification model for one or more languages. Through use of the zero-shot and/or few-shot techniques disclosed herein, various computational efficiencies can be achieved. As one example, computational resources utilized in training the multilingual classification model can be minimized, as few training examples (few-shot) and/or no training examples (zero-shot) can be utilized for various languages during training, while the trained multilingual classification model can still be utilized to accurately and robustly classify natural language inputs in those languages. For instance, a large quantity of training examples for each of N (e.g., N=3 or more, 5, or more, 10 or more, etc.) languages can be utilized to train the multilingual classification model, while a small quantity (or no) training examples for each of M (e.g., M=3 or more, 5, or more, 10 or more, etc.) language can be utilized to train the multilingual classification model. Nonetheless, accurate and robust classification can still be achieved, using the trained multilingual classification model, for natural language inputs in each of the M languages. As another example, various computational resources that are utilized in generating supervised training examples in various languages can be minimized. For instance, resources may not need to be consumed to generate labels for training examples in some languages (zero-shot) and/or may only need to be consumed in generating labels for a few training examples in some language(s) (few-shot).

Further, various learning, model architecture(s), and/or other techniques disclosed herein enable training and use of a multilingual classification model that generates accurate classifications for a large quantity of languages. As mentioned above, training of such a model can achieve various computational efficiencies. For example, training of such a model can utilize a smaller quantity of training examples than compared to, for example, training a separate model for each of the different languages. Moreover, the model, once trained, can be stored with less memory than, for example, a different classification model for each language. Such a memory savings, while still enabling classification predictions across a variety of languages, can be beneficial in many scenarios, such as scenarios where a client device stores the multilingual classification model locally and locally processes natural language inputs using the model.

The above description is provided as an overview of various implementations. These and other implementations are described in additional detail herein.

Training and/or using a multilingual classification neural network model to perform a natural language processing classification task, where the model reuses an encoder portion of a multilingual neural machine translation model. In a variety of implementations, a client device can generate a natural language data stream from a spoken input from a user. The natural language data stream can be applied as input to an encoder portion of the multilingual classification model. The output generated by the encoder portion can be applied as input to a classifier portion of the multilingual classification model. The classifier portion can generate a predicted classification label of the natural language data stream. In many implementations, an output can be generated based on the predicted classification label, and a client device can present the output.

In some implementations, a method implemented by one or more processors is provided that includes receiving a natural language data stream in a first language, the natural language data stream generated based on user interface input of a user via a client device. In various implementations, the method includes generating a classification label prediction for the natural language data stream in the first language, wherein generating the classification label prediction includes processing, using an encoder portion of a multilingual classification model, the natural language data stream to generate encoder output. In many implementations, the method further includes processing, using a classifier portion of the multilingual classification model, the encoder output to generate a classification label prediction for the natural language data stream in the first language, wherein the multilingual classification model is a trained neural network model, wherein the encoder portion is a reused multilingual neural machine translation encoder that was trained using a plurality of languages that include the first language and at least a second language, and wherein the multilingual classification model is trained for a classification task using at least second language supervised training examples that each have respective second language training example input that is in the second language. In many implementations, the method further includes generating output using the classification label prediction for the natural language data stream in the first language. In many implementations, the method further includes causing the client device to render the output for presentation to the user.

These and other implementations of the technology disclosed herein can include one or more of the following features.

In various implementations, the multilingual classification model is trained for the classification task without using any first language supervised training example that has first language training example input that is in the first language.

In various implementations, the multilingual classification model is trained for the classification task using a first quantity of the second language supervised training examples that each have the respective second language training example input that is in the second language, wherein the multilingual classification model is trained for the classification task using a second quantity of first language supervised training examples that each have respective first language training example input that is in the first language, and wherein the second quantity is less than fifty percent of the first quantity. In some versions of those implementations, the second quantity is less than ten percent of the first quantity, or less than five percent of the first quantity.

In various implementations, the multilingual neural machine translation encoder was trained to translate from at least the first language to at least the second language and/or from at least the second language to at least the first language.

In various implementations, training the multilingual classification model using the second language supervised training examples includes processing the second language training examples inputs using the encoder portion and the classifier portion to generate predicted outputs, and updating weights of the classifier portion based on errors determined based on the predicted outputs and based on labels for the second language supervised training examples, without updating any weights of the reused encoder portion.

In various implementations, processing, using the encoder portion, the natural language data stream to generate the encoder output includes processing the natural language data stream, using a bi-directional recurrent network layer of the encoder portion, to generate bi-directional recurrent output. In many implementations, the method further includes processing the bi-directional recurrent output using one or more unidirectional recurrent network layers of the encoder portion, wherein the encoder output comprises one or more hidden states of a last unidirectional recurrent network layer in the one or more unidirectional recurrent network layers.

In various implementations, processing, using the classifier portion, the encoder output to generate the classification label prediction includes processing the encoder output, using pooling layers of the classifier portion, to generate pooling output. In many implementations, the method further includes processing the pooling output, using one or more softmax layers of the classifier portion, to generate the classification label prediction. In some versions of those implementations, processing the encoder output, using the pooling layers to generate the classification label prediction includes processing, using a pre-pooling feed-forward layer of the pooling layers, the encoder output to generate a pre-pooling output. In some versions of those implementations, the method further includes processing, using a pooling layer of the pooling layers, the pre-pooling output to generate a pooling output. In some versions of those implementations, the method further includes processing, using a post-pooling feed-forward layer of the pooling layers, the pooling output to generate a post-pooling output. In some versions of those implementations, the method further includes processing, using the one or more softmax layers, the post-pooling output to generate the classification label prediction for the natural language data stream in the first language.

In various implementations, the plurality of languages includes at least the first language, the second language, and a third language.

In various implementations, the user interface input is spoken input and the method further includes generating the natural language data stream by converting the spoken input to text using a speech-to-text processor.

In various implementations, the classification task is a natural language inference classification task and wherein the classification label prediction indicates whether the natural language data stream is an entailment, is neutral, or is a contradiction. In some versions of those implementations, the classification label prediction indicates that the natural language data stream is the entailment, and generating the output using the classification label prediction includes, in response to the classification label prediction indicating that the natural language data stream is the entailment, using an immediately preceding natural language data stream, in combination with the natural language data stream, in generating the output. In some versions of those implementations, the natural language data stream and the preceding natural language data stream are each generated based on respective spoken input. In some versions of those implementations, the method further includes determining, using the classification label prediction, that the natural language data stream includes a request to modify a state of a networked hardware device. In some versions of those implementations, in response to determining that the natural language data stream includes the request to modify the state of the networked hardware device, the method further includes causing a control signal to be provided to the networked hardware device, wherein the control signal causes the state of the networked hardware device to be modified. In some versions of those implementations, the output perceptibly indicates the modification of the state of the networked hardware device. In some versions of those implementations, the networked hardware device is selected from the group consisting of a light, a thermostat, and a networked camera.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
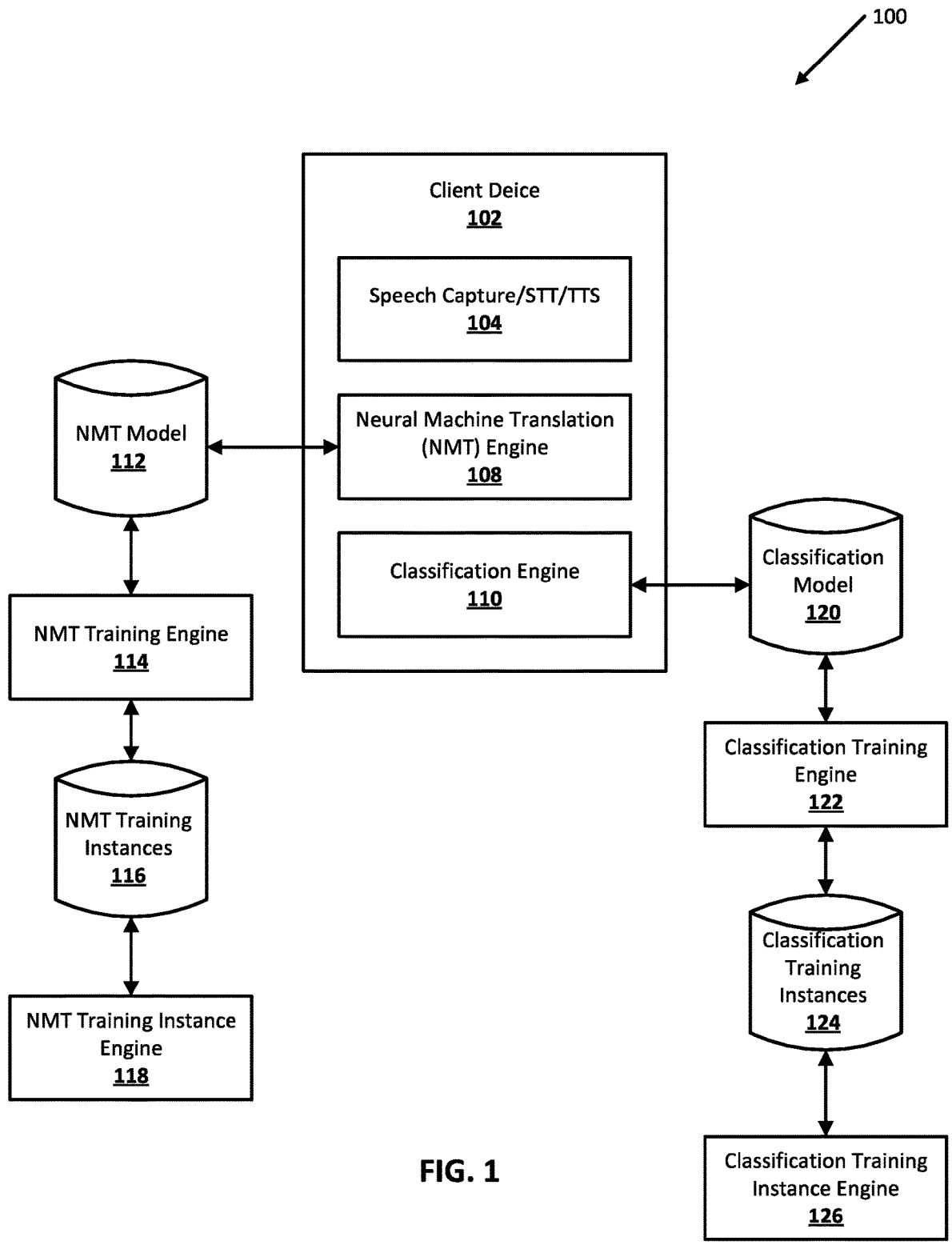
FIG. 1 is a block diagram of an example environment in which implementations disclosed herein may be implemented.

FIG. 1 illustrates an example environment in which implements disclosed herein may be implemented. The example environment 100 in FIG. 1 includes client device 102, multilingual NMT engine 108 (also referred to herein as "NMT engine"), multilingual NMT training engine 114 (also referred to herein as "NMT training engine"), multilingual NMT training instance engine 118 (also referred to herein as "NMT training instance engine"), multilingual classification engine 110 (also referred to herein as "classification engine"), multilingual classification training engine 122 (also referred to herein as "classification training engine"), and multilingual classification training instance engine 126 (also referred to herein as "classification training instance engine"). The client device 102 may be, for example, a standalone voice-activated speaker device, a desktop computing device, a laptop computing device, a tablet computing device a mobile phone computing device, a computing device of a vehicle of the user (e.g., an in-vehicle communications system, an in-vehicle entertainment system, an in-vehicle navigation system), and/or a wearable apparatus of the user that includes a computing device (e.g., a watch having a computing device, glasses having a computing device, a virtual or augmented reality computing device, etc.). Additional and/or alternative client devices may be provided.

Multilingual NMT engine 108, multilingual NMT training engine 114, multilingual NMT training instance engine 118, multilingual classification engine 110, multilingual classification training engine 122, and multilingual classification training instance engine 126 are example components in which techniques described herein may be implement and/or with which systems, components, and techniques described herein may interface. The operations performed by one or more engines 108, 110, 114, 118, 122, 126 of FIG. 1 may be distributed across multiple computing systems. In some implementations, one or more aspects of engines 108, 110, 114, 118, 122, 126 may be combined in a single system and/or one or more aspects by be implemented on the client device 102. For example, in some of those implementations, aspects of multilingual NMT engine 108 may be combined with aspects of multilingual classification engine 110. Engines in accordance with many implementations may each be implemented in one or more computing devices that communicate, for example, through a communication network. A communication network may include a wide area network such as the Internet, one or more local area networks ("LAN"s) such as Wi-Fi LANs, mesh networks, etc., and/or one or more bus subsystems. A communication network may optionally utilize one or more standard communication technologies, protocols, and/or inter-process communication techniques.

In many implementations, a client device 102 can include speech capture/speech-to-text ("STT")/text-to-speech ("TTS") module 104. In other implementations, speech capture/STT/TTS module may be implemented separately from client device 102. In many implementations, speech capture/STT/TTS module 104 can generate speech recognition output (e.g., a Natural Language ("NL") data stream) based on a spoken input to client device. Additionally or alternatively, speech capture/STT/TTS module 104 may be configured to perform one or more functions: capture a user's speech, e.g., via a microphone; convert that captured audio to text (and/or other representations or embeddings); and/or convert text to speech.

In a variety of implementations, a NL data stream can be generated from spoken input from a user via client device 102 (e.g., by processing the spoken input through speech capture/STT/TTS module 104). NL data streams can be generated from a variety of forms of user interface input including spoken input captured by microphone(s) (and optionally converted to text as described herein), typed input (e.g., captured by physical and/or virtual keyboards), gestures, etc. In some implementations, the NL data stream includes a sequences of tokens. The tokens of the sequence can each be one or more characters, such as one or more words (e.g., "chicago" or "new york") or character(s) that make up part of a word (e.g., tokens of "c", "h", "i", "a", "g", "o" instead of a single token of "chicago"). In many implementations, tokens of the NL data stream can be applied as input to the multilingual classification model 120 (also referred to herein as "classification model") to generate a predicted output for an NLP task utilizing multilingual classification engine 110. In some implementations, speech capture/STT/TTS module 104 can convert a predicted classification label into a spoken representation which can be presented to the user using an audio device of client 102 (such as a speaker in a stand-alone voice activated speaker). Additionally or alternatively, a predicted classification label generated by multilingual classification engine 110 can be utilized by client device 102 to provide control signals for one or more linked devices associated with the client device such as networked hardware devices, third party applications, applications stored locally on the client device, etc. In a variety of implementations, networked hardware devices can include: a smart thermostat, a smart refrigerator, networked cameras, smart lights, smart light switches, etc.

Figure 2:
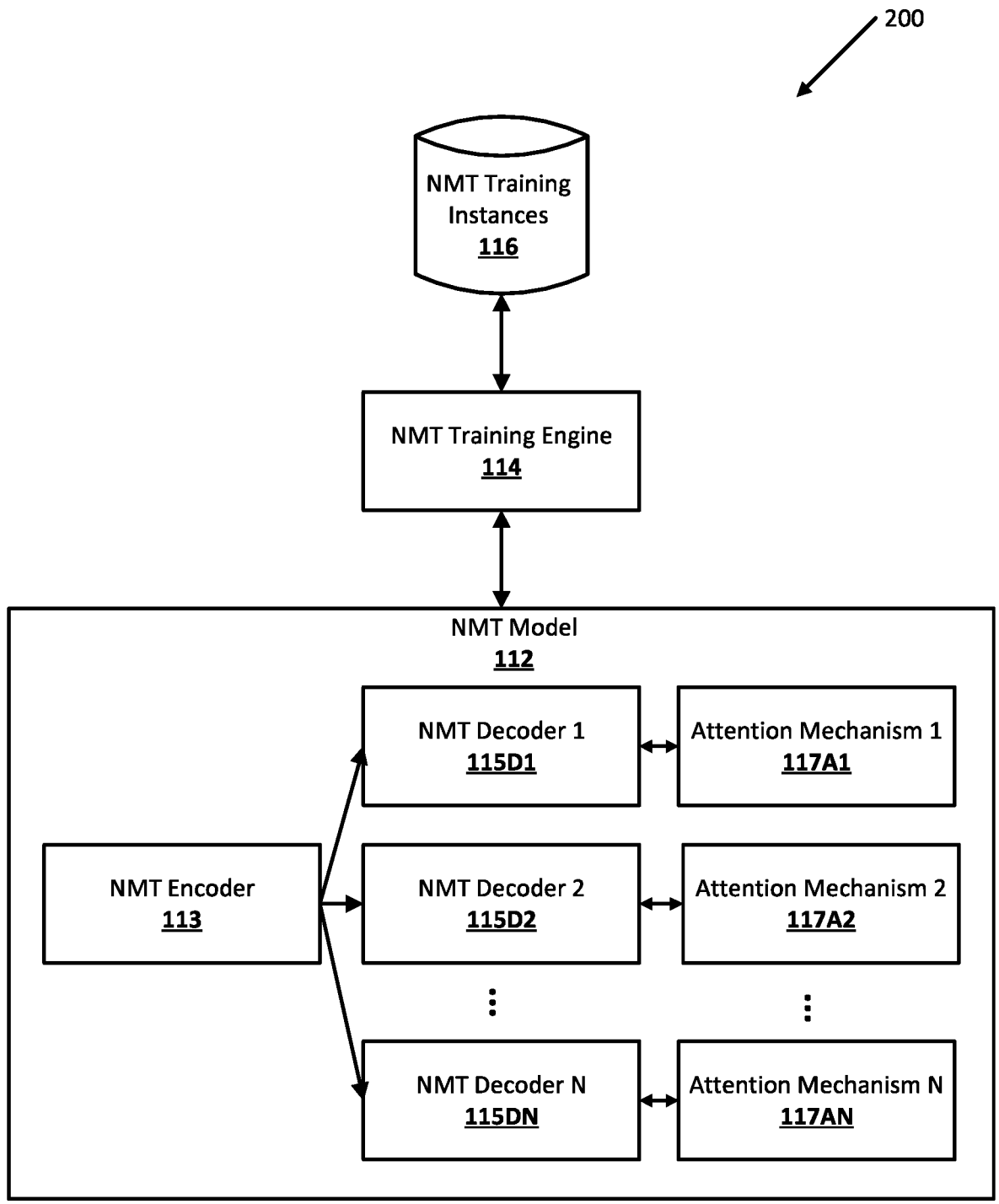
FIG. 2 illustrates an example of training a multilingual neural machine translation model according to implementations disclosed herein.
Figure 3:
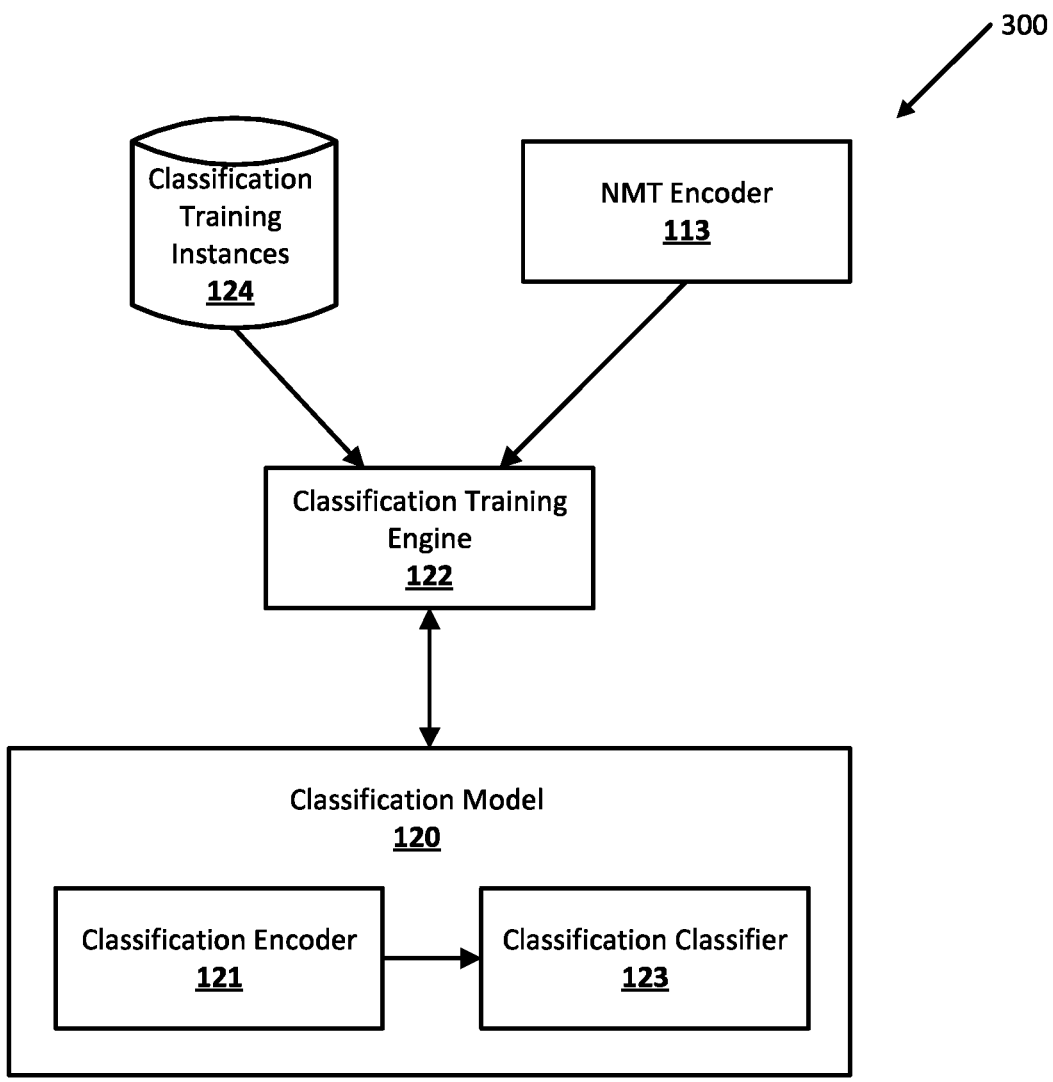
FIG. 3 illustrates an example of training a multilingual classification model according to implementations disclosed herein.
Figure 4:
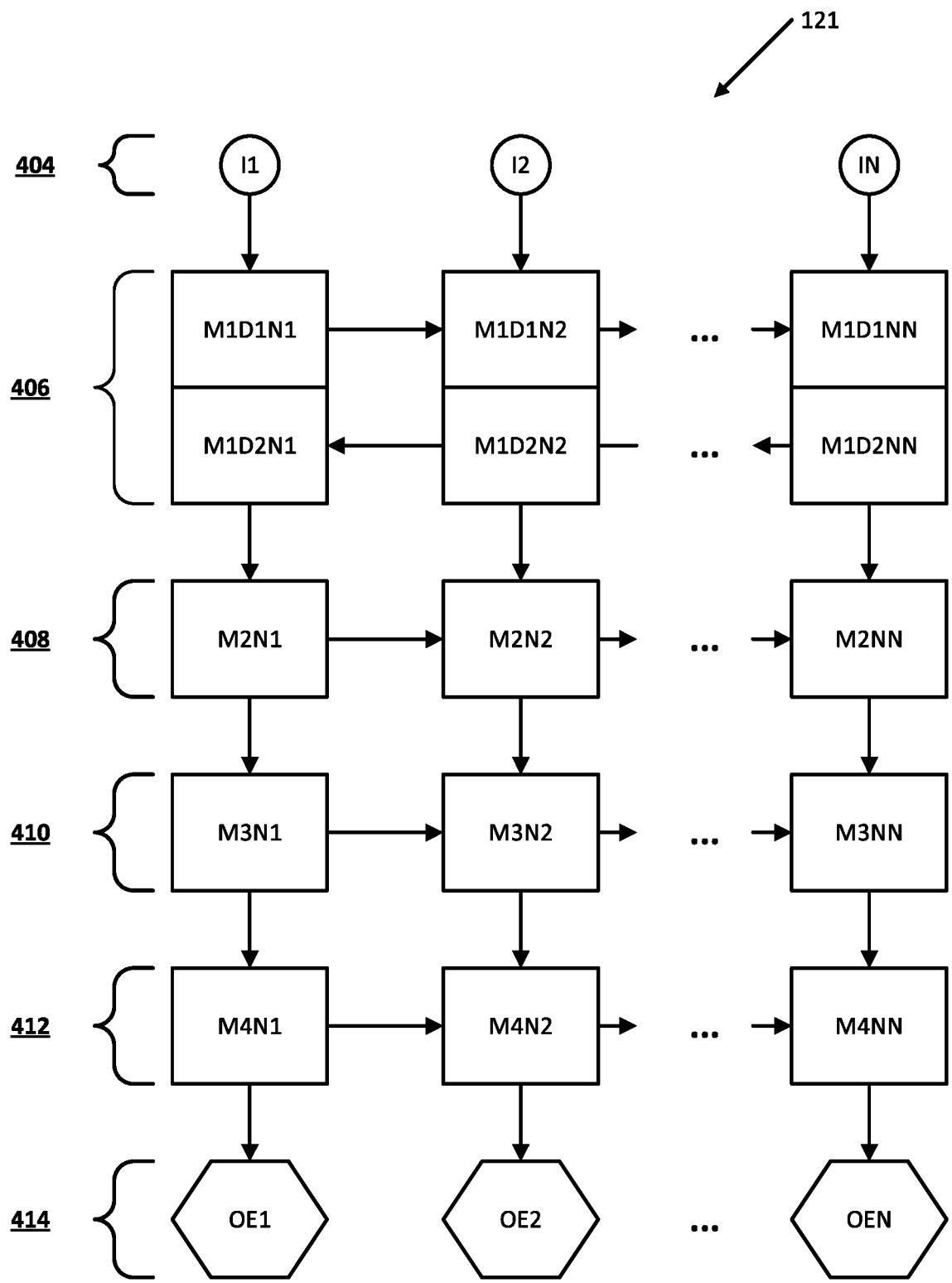
FIG. 4 illustrates an example of an encoder portion of a multilingual classification model according to implementations disclosed herein.

In many implementations, client device 102, using multilingual NMT engine 108, can train multilingual NMT model 112 (also referred to herein as "NMT model") before reusing an encoder portion of multilingual NMT model 112 to initialize an encoder portion of multilingual classification model 120 (such as multilingual classification encoder portion 121 illustrated in FIG. 3 and FIG. 4). Training multilingual NMT model 112 in accordance with many implementations described herein, for example utilizing multilingual NMT engine 108, multilingual NMT training engine 114, and multilingual NMT training instance engine 118, is described in below with respect to FIG. 2. Additionally or alternatively, multilingual NMT engine 108 may be omitted. For example, in some such implementations, client device 102 can have access (stored locally on the client device and/or remote access via a communication network) to a trained encoder portion of multilingual NMT model 112 (such as multilingual NMT encoder portion 113 illustrated in FIG. 3).

Additionally or alternatively, in a variety of implementations, client device 102, utilizing multilingual classification engine 110, can train multilingual classification model 120. Training multilingual classification model 120, for example utilizing multilingual classification engine 110, multilingual classification training engine 122, and multilingual classification training instance engine 126, is described below with respect to FIG. 3.

Multilingual classification model 120 can be trained to solve a variety of NLP tasks including: semantic analysis, recognizing textual entailment, word sense disambiguation, topic recognition, sentiment analysis, etc. For example, recognizing textual entailment determines a relationship between sentences and/or phrases. In a variety of implementations, a multilingual classification model 120 trained for the NLP task of recognizing textual entailment can generate at least three classification labels: entailment, contradiction, and neutral. An entailment classification label indicates a second phrase and/or sentence is entailed (i.e., a consequence of) the first phrase and/or sentence. A contradiction classification label can indicate the second phrase and/or sentence is contradicted by the first phrase and/or sentence. Similarly, a neutral classification label can indicate a second sentence and/or phrase is neither entailed nor contradicted by the first sentence and/or phrase. In a variety of implementations, client device 102 can generate a first NL data stream and a second NL data stream from spoken input from a user via speech capture/TTS/STT module 104. The first and second NL data streams can be provided to multilingual classification module 120 to provide a classification label of entailment, contradiction, and/or neutral. The classification label can be utilized to determine if the first and second NL data streams are related and, for example, if a second phrase and/or sentence provide by a user is an additional command for a networked hardware device. For example, a user can speak "turn on the light" as a first phrase and "make it blue" as a second phrase. Speech capture/TTS/STT module 104 can convert both phrases into a first NL data stream and a second NL data stream. Multilingual classification model 120, utilizing multilingual classification engine 110, can determine a textual entailment classification label indicating the relationship between the phrases "turn on the light" and "make it blue". For example, the multilingual classification module 120 can determine "make it blue" is entailed by "turn on the light". A classification label of entailment can indicate the phrases are related and the client device 102 can send a command to a smart light to turn on the light and to change the color of the light to blue. Additionally or alternatively, a classification label of contradiction and/or neutral can indicate the phrases are not related. For example, if the smart light is unable to change to the color blue, the multilingual classification model 120 can generate a predicted classification label of contradiction and/or neutral. In some such implementations, client device 102 can turn on the smart light and ask for additional information regarding the spoken phrase "make it blue".

As a further example, semantic analysis can approximate a concept of a sentence and/or phrase. A multilingual classification model 120 trained for the NLP task of semantic analysis can generate a predicted classification label indicating the concept of a sentence and/or phrase. For example, a user can provide the phrase "play me some music" as spoken input to client device 102. Speech recognition/STT/TTS module 104 can generate a NL data stream from the spoken input and, utilizing multilingual classification engine 110, provide the NL data stream as input to multilingual classification model 120. Multilingual classification model 120 trained for semantic analysis can provide a classification label for the spoken input "play me some music" indicating a classification label that relates to playing music. Upon receiving a classification label indicating playing music, client device 102 (for example using an additional unillustrated music engine) can determine music to play for a user as well as play music for the user via one or more speaker devices associated with client device 102.

FIG. 2 illustrates an example image 200 for training multilingual NMT model 112 in accordance with various implementations. An NMT training instance is retrieved from the multilingual NMT training instances 116. The NMT training instance can be generated by the multilingual NMT training instance engine 118 (illustrated in FIG. 1) and, for example, can include a pair of information such as NMT training input and NMT known output. In many implementations, the pair can be a phrase and/or a sentence in a first language (i.e., NMT training input) and the phrase and/or a sentence in the first language translated in a second language (i.e., NMT known output). For example, the NMT training input can be an English phrase and the corresponding NMT known output can be the known translation of the English phrase as a German phrase. Additionally or alternatively, a phrase and/or sentence in a first language can be translated into multiple additional languages (i.e., into a second language, into a third language, into a fourth language, etc.). As another example, the NMT training input can be an English phrase and the corresponding NMT known output can be the translation of the English phrase (i.e., NMT training input) into a German phrase, a French phrase, a Spanish phrase, etc. (i.e., NMT known output).

The multilingual NMT training engine 114 applies an NMT training instance as input to train a multilingual NMT model 112. In a variety of implementations, multilingual NMT model 112 can be trained using supervised learning. For example, the multilingual NMT training engine 114 can generate NMT model output by applying NMT training input to the multilingual NMT model 112. Additionally or alternatively, multilingual NMT training engine 114 can compare NMT model output with NMT known output and, using the comparison, update one or more weights in the multilingual NMT model 112 (e.g., backpropagate the difference over the entire multilingual NMT model 112). Process 600 illustrated in FIG. 6 describes a process of training a multilingual NMT model in accordance with many implementations disclosed herein.

In many implementations, a multilingual NMT model 112 can include a variety of neural network layers including a multilingual NMT encoder portion 113 (also referred to herein as "NMT encoder") and one or more multilingual NMT decoder portion(s) 115D1-115DN (also referred to herein as "NMT decoder"). In some such implementations, each multilingual NMT decoder portion(s) 115D1-115DN can have a corresponding attention mechanism(s) 117A1-117AN. In many implementations, multilingual NMT encoder portion 113 can include a variety of recurrent network layers. For example, multilingual NMT encoder portion 113 can include a first bi-directional recurrent network layer and a stack of three unidirectional recurrent network layers. In a variety of implementations, multilingual classification encoder portion 121 of multilingual classification model 120 can mirror the layers of multilingual NMT encoder portion 113. For example, recurrent network layers 406-412 (FIG. 4) which can include a combination of bi-directional and/or unidirectional LSTM layers, can mirror the combination of recurrent network layers utilized in multilingual NMT encoder portion 113. In a variety of implementations, utilizing the same combination of recurrent network layers in NMT encoder portion 113 and classification encoder portion 121 can facilitate the reuse of multilingual NMT encoder portion 113 to initialize multilingual classification encoder portion 121.

Multilingual NMT model 112 can share a single multilingual NMT encoder 113 with one or more multilingual NMT decoder portion(s) 115D1-115DN with corresponding attention mechanism(s) 117A1-117AN. For example, multilingual NMT model 112 can be trained to translate between N number of languages. Using a shared multilingual NMT encoder portion 113, a separate N number of multilingual NMT decoder portions 115 with corresponding attention mechanisms 117 can be utilized, where each multilingual NMT decoder portion 115 and corresponding attention mechanism 117 translates an individual language. As a further example, multilingual NMT decoder portion 115D1 and corresponding attention mechanism 117A1 can translate input from multilingual NMT encoder portion 113 into a first language, multilingual NMT decoder portion 115D2 and corresponding attention mechanism 117A2 can translate input from multilingual NMT encoder portion 113 into a second language, etc., until the final Nth language can be translated using multilingual NMT decoder portion 115DN and corresponding attention mechanism 117DN.

In many implementations, multilingual NMT decoder portion(s) 115D1-115DN can include one or more recurrent network layers such as bi-directional recurrent network layers and/or unidirectional recurrent network layers. For example, multilingual NMT decoder portion(s) in accordance with a variety of implementations, can include a stack of four unidirectional recurrent network layers utilizing LSTM units. In many implementations, the first recurrent network layer can be intertwined with an attention mechanism. Attention mechanisms, in accordance with many implementations, can allow a decoder portion to refer back to the entire input sequence instead of forcing a neural network model to encode all information into a fixed length vector. In other words, an attention mechanism can give a neural network model (such as multilingual NMT model 112) access to its internal memory (i.e., hidden states of a network portion such as multilingual NMT encoder portion 113) and can learn through training what to retrieve from the encoder portion to use in a decoder portion of a neural network model.

FIG. 3 illustrates an example image 300 of training multilingual classification model 120 in accordance with various implementations. Multilingual classification training engine 122 can initialize multilingual classification encoder portion 121 by reusing a trained multilingual NMT encoder portion 113 of multilingual NMT model 112. Additionally or alternatively, multilingual classification training instance engine 126 (FIG. 1) can generate a classification training instance from the multilingual classification training instances 124. In some implementations, a classification training instance can include a pair of information for an NLP classification task such as classification training input and classification known output. In many implementations, the pair can be a phrase and/or sentence (i.e., classification training input) and a known classification label of the phrase and/or sentence for the NLP classification task (i.e., classification known output).

Figure 5:
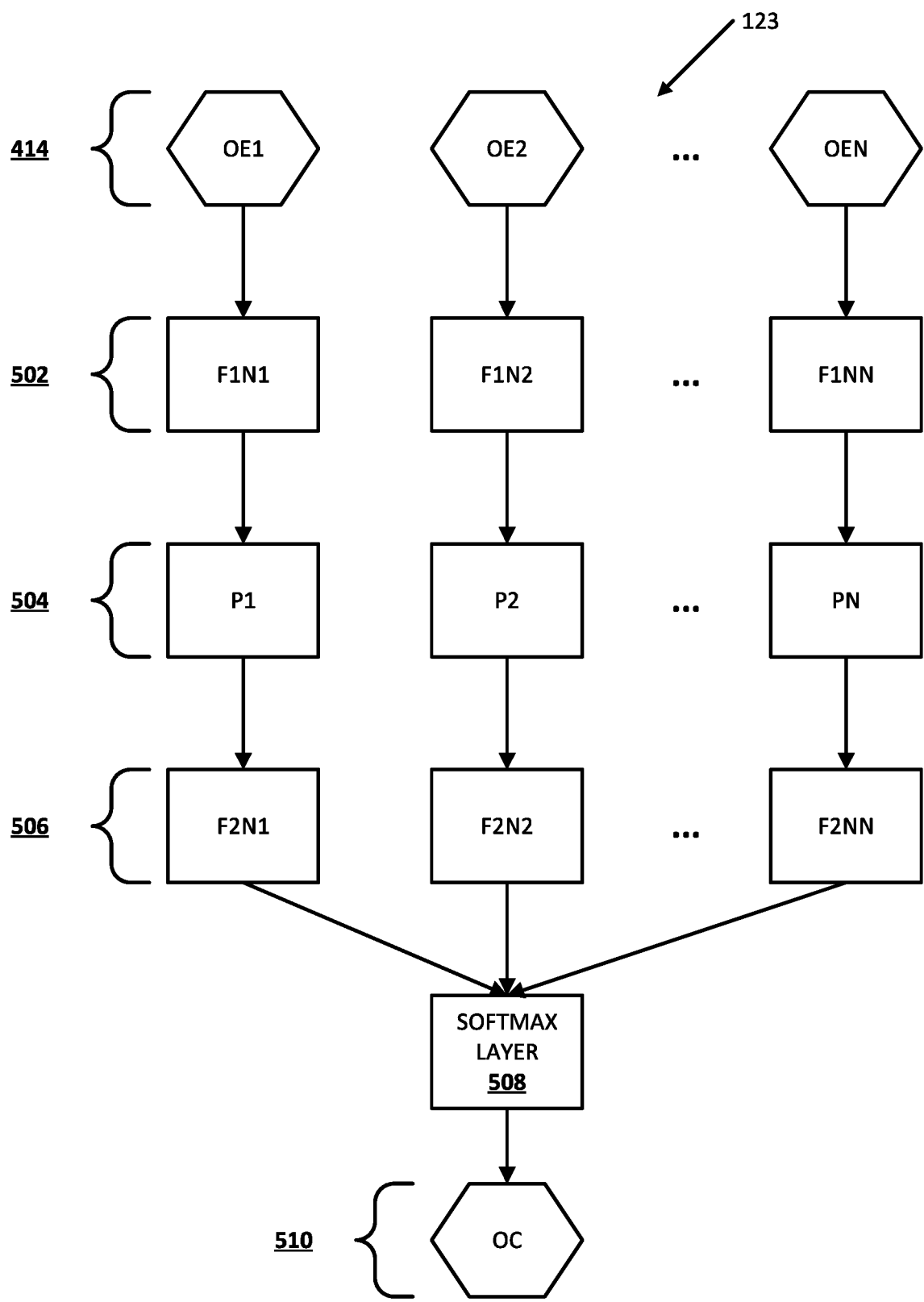
FIG. 5 illustrates an example of a classifier portion of a multilingual classification model according to implementations disclosed herein.

In a variety of implementations, multilingual classification model 120 can include multilingual classification encoder portion 121 (also referred to herein as "classification encoder") and multilingual classification classifier portion 123 (also referred to herein as "classification classifier"). Multilingual classification encoder portion 121 can include a variety of recurrent network layers. A multilingual classification encoder portion 121 in accordance with a variety of implementations is illustrated in FIG. 4. Additionally or alternatively, multilingual classification classifier portion 123 can include a variety of neural network layers including: feed-forward layers, pooling layers, softmax layers, etc. A multilingual classification classifier portion 123 in accordance with a variety of implementations is illustrated in FIG. 5.

In a variety of implementations, multilingual classification training instance engine 126 can generate training instances to utilize zero-shot learning. Utilizing zero-shot learning can train a multilingual classification model 120 to generate a classification label for input from a user via a client device in a first language without using any training instances in the first language. For example, multilingual classification model 120 can utilize a language agnostic representation generated using trained multilingual NMT encoder portion to enable a neural network model to generate predicted classification labels for input in a language other than the language(s) of training instances used to train the neural network model.

Additionally or alternatively, multilingual classification training instance engine 126 can generate training instances to utilize few-shot learning. Utilizing few-shot learning can train a multilingual classification model 120 to generate a classification label for input from a user via a client device in a first language with only using a few training instances in the first language. In many implementations, using a small number of training examples in the input language can increase classification label prediction accuracy.

Multilingual training engine 122 can apply a classification training instance in accordance with many implementations as input to train multilingual classification model 120. In a variety of implementations, multilingual classification model 120 can be trained using supervised learning. For example, the multilingual classification training engine 122 can generate classification model output by applying classification training input to the multilingual classification model 120. Additionally or alternatively, multilingual classification training engine 122 can compare classification model output with classification known output and, using the comparison, update one or more weights in the multilingual classification model 120 (e.g., backpropagate the difference over the entire multilingual classification model 120). In some implementations, the multilingual classification training engine 122 can backpropagate the difference over the entire multilingual classification model 120 including multilingual encoder portion 121 and multilingual classification classifier portion 123. In other implementations, the multilingual classification training engine 122 can backpropagate the difference over only the multilingual classification classifier portion 123 while leaving the multilingual classification encoder portion 121 unchanged (i.e., freezing the multilingual classification encoder portion after it is initialized using a trained multilingual NMT encoder portion). Process 700 illustrated in FIG. 7 describes a process of training a multilingual classification model in accordance with many implementations disclosed herein.

FIG. 4 illustrates a multilingual classification encoder portion 121 of a multilingual classification model in accordance with a variety of implementations described herein. In many implementations, multilingual classification encoder portion 121 of a multilingual classification model can be initialized by reusing a trained multilingual NMT encoder portion 113 (as illustrated in FIG. 2) of a multilingual NMT model. In some such implementations, multilingual classification encoder portion 121 has the same combination of neural network layers as multilingual NMT encoder portion 113 such that trained weights in the multilingual NMT encoder portion 113 can be directly reused as weights in multilingual classification encoder portion 121. For example, weights learning during training NMT encoder portion 113 can be reused in one or more recurrent network layers of multilingual classification encoder portion 121 such as recurrent network layers 406-412. In some implementations, initialized weights in classification encoder portion 121 can be updated during training of multilingual classification model 102. In other implementations, initialized weights in classification encoder portion 121 can remain unchanged during training (e.g., weights in classification encoder portion 121 can remain frozen with weights reused from NMT encoder portion 113 and only weights in the multilingual classification classifier portion 123 are updated during training). Classification model input 404 can include I1-I4. In various implementations, I1-IN can include training input for multilingual classification model 120. In other implementations, I1-IN can include a NL data stream to classify using multilingual classification model 120.

Classification encoder portion 121 can include a variety of combinations of recurrent network layers including bi-direction memory layer(s) and/or unidirectional memory layer(s). In many implementations, recurrent network layers can utilize memory units including LSTM units and/or GRUs. For example, the first layer of classification encoder portion 121 can include a bi-directional recurrent network layer (such as a bi-directional LSTM layer) 406 which includes first direction memory units M1D1N1-M1D1NN and second direction memory units M1D2N1-M1D2NN. In some such implementations, classification encoder portion 121 can additionally include a stack of three unidirectional recurrent network layers (such as unidirectional LSTM layers) 408, 410, 412.

Input I1-IN can be applied as input to first direction memory units M1D1N1-M1D1NN. For example, I1 can be applied as input to M1D1N1. Output generated based on the application of I1 to M1D1N1 can be applied as input to M1D1N2, along with I2. Output generated based on the application of I2 and the output of M1D1N1 to M1D1N2, along with I3 can be applied as input to M1D1N3. This continues until M1D1NN is reached.

The second direction memory units M1D2N1-M1D2NN similarly operate on input I1-IN in a second direction that is opposite their actual sequence. For example, IN is applied as input to M1D2NN. Output based on application of IN to M1D2NN is applied to M1D2NN-1 (unillustrated), along with input IN-1 (also unillustrated). This continues until M1D2N1 is reached.

First unidirectional recurrent layer 408 includes unidirectional recurrent network layer with memory units M2N1-M2NN. The output generated based on the first bi-directional recurrent memory layer 406 is applied as input to first unidirectional recurrent network layer 408. For example, the output generated based on M1D1N1 and M1D2N1 (e.g., a concatenation of the two inputs) is applied as input to M2N1. The output generated based on M1D1N1 and M1D2N1 applied to M2N1 is applied to M2N2, along with the output generated based on M1D1N2 and M1D2N2. This continues in one direction until M2NN is reached.

Additionally or alternatively, classification encoder portion 121 can utilize a stack of unidirectional recurrent memory layers 408, 410, 412. Similarly, the output generated by M2N1 can be applied as input to M3N1. The output generated by M3N1 can be applied as input to M3N2 along with output generated based on the output of M2N2. This can continue until M3NN is reached. Additionally or alternatively, the output generated by M3N1 can be applied as input to M4N1. Output generated by M4N1 as well as output generated by M3N2 can be applied to M4N2 as input. This can continue until M4NN is reached.

In a variety of implementations, output of the classification encoder portion 414 can include OE1-OENN. OE1 can include the output generated by M4N1, OE2 can include output generated by M4N2, etc. until OEN is reached. In a variety of implementations, OE1-OENN can be utilized as input to multilingual classification classifier portion 123.

FIG. 5 illustrates a multilingual classification classifier portion 123. In many implementations, classification classifier can include a variety of feed-forward and/or pooling layers. For example, classification classifier can utilize pre-pooling feed-forward layer 502, pooling layer 504, and post pooling feed-forward layer 506. Additionally or alternatively, softmax layer 508 can combine output of post pooling feed-forward layer 506 to generate classification label 510.

In a variety of implementations, pre-pooling feed-forward layer 502 can include a plurality a feed-forward units F1N1-F1NN. For example, F1N1-N1NN can receive output generated by classifier encoder 414 which can include OE1-OEN. F1N1 can receive OE1 as input, F1N2 can receive OE2, etc. until F1NN receives input OEN. The output generated by F1N1-F1NN can be provided as input to pooling layer 504 which can include units P1-PN. For example, F1N1 can be provided to P1 as input, F1N2 can be provided to P2 as input, etc. until F1NN is provided to PN as input. Additionally or alternatively, the output generated by P1-PN can be applied to post-pooling feed-forward layer 506. For example, the output generated by P1 can be applied to F2N1 as input, the output generated by P2 can be applied to F2N2 as input, etc., until the output generated by PN is provided to F2NN as input. Furthermore, the output of F2N1-F2NN can be applied to softmax layer 508. Softmax layer 508 can generate classification label 510.

Figure 6:
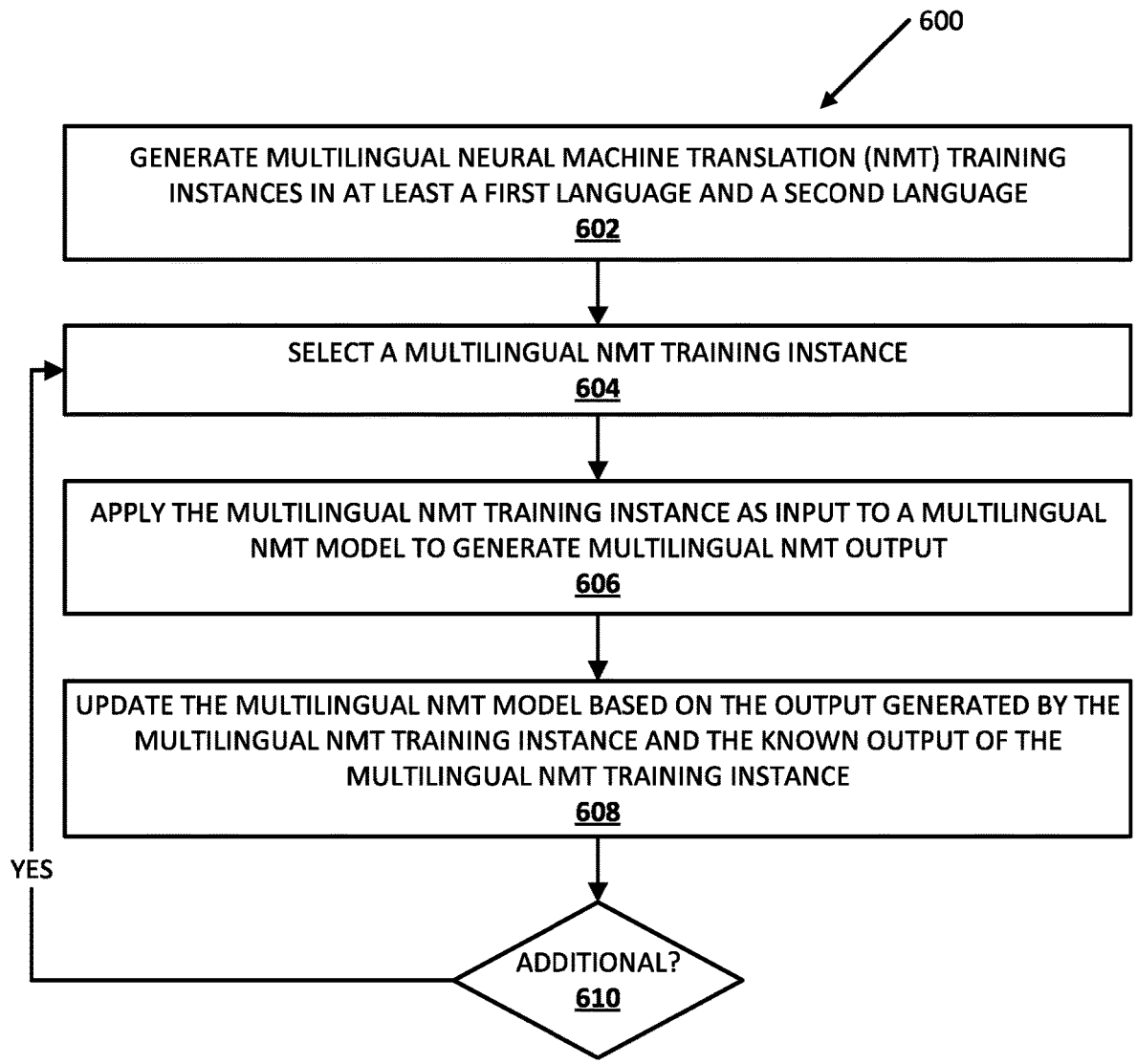
FIG. 6 is a flowchart illustrating a process of training a multilingual neural translation model according to implementations disclosed herein.

FIG. 6 is a flowchart illustrating an example process 600 of training a multilingual NMT model according to various implementations disclosed herein. For convenience, the operations of FIG. 6 are described with reference to a system that performs the operations. This system may include various components of various computer systems, such as one or more components of client device 102. Moreover, while operations of process 600 are shown in a particular order, this is not meant to be limiting. One or more operations may be reordered, omitted, or added.

At block 602, the system generates multilingual NMT training instances in at least a first language and a second language. In many implementations, a multilingual NMT training instances can include at least a pair of phrases and/or sentences including a phrase and/or sentence in the first language and a known translation of the phrase and/or sentence in the second language. Additionally or alternatively, a multilingual NMT training instance can include at least a pair of phrases and/or sentences including a phrase and/or sentence in the second language and known translation of the phrase and/or sentence in the first language. In a variety of implementations, multilingual training instances can be generated in additional languages.

At block 604, the system selects a multilingual NMT training instance generated at block 602.

At block 606, the system applies the multilingual NMT training instance as input to a multilingual NMT model to generate multilingual NMT output. In many implementations, the multilingual NMT model can include, for example, a shared NMT encoder portion, and a separate NMT decoder portion with corresponding attention mechanism per language the multilingual NMT model can translate to.

At block 608, the system updates the multilingual NMT model based on the output generated by the multilingual NMT training instance and the known output of the multilingual NMT training instance. For example, the system can determine an error based on the generated multilingual NMT output and the known output of the NMT training instance, and backpropogate the error over the neural network model to update weights of the multilingual NMT model.

At block 610, the system determines whether there are one or more additional unprocessed multilingual NMT training instances. If so, the system proceeds back to block 604, selects an additional multilingual NMT training instance, then performs blocks 606 and 608 based on the additional unprocessed multilingual NMT training instance. In some implementations, at block 610 the system may determine not to process any additional unprocessed multilingual NMT training instances if one or more training criteria has been satisfied (e.g., a threshold number of epochs have occurred, a threshold duration of training has occurred, and/or all multilingual NMT training instances have been processed). Although process 600 is described with respect to a non-batch learning technique, batch learning may additionally and/or alternatively be utilized.

An encoder portion of a multilingual NMT neural network model trained according to process 600 can thereafter be reused to initialize an encoder portion of an additional neural network model such as a multilingual classification model.

Figure 7:
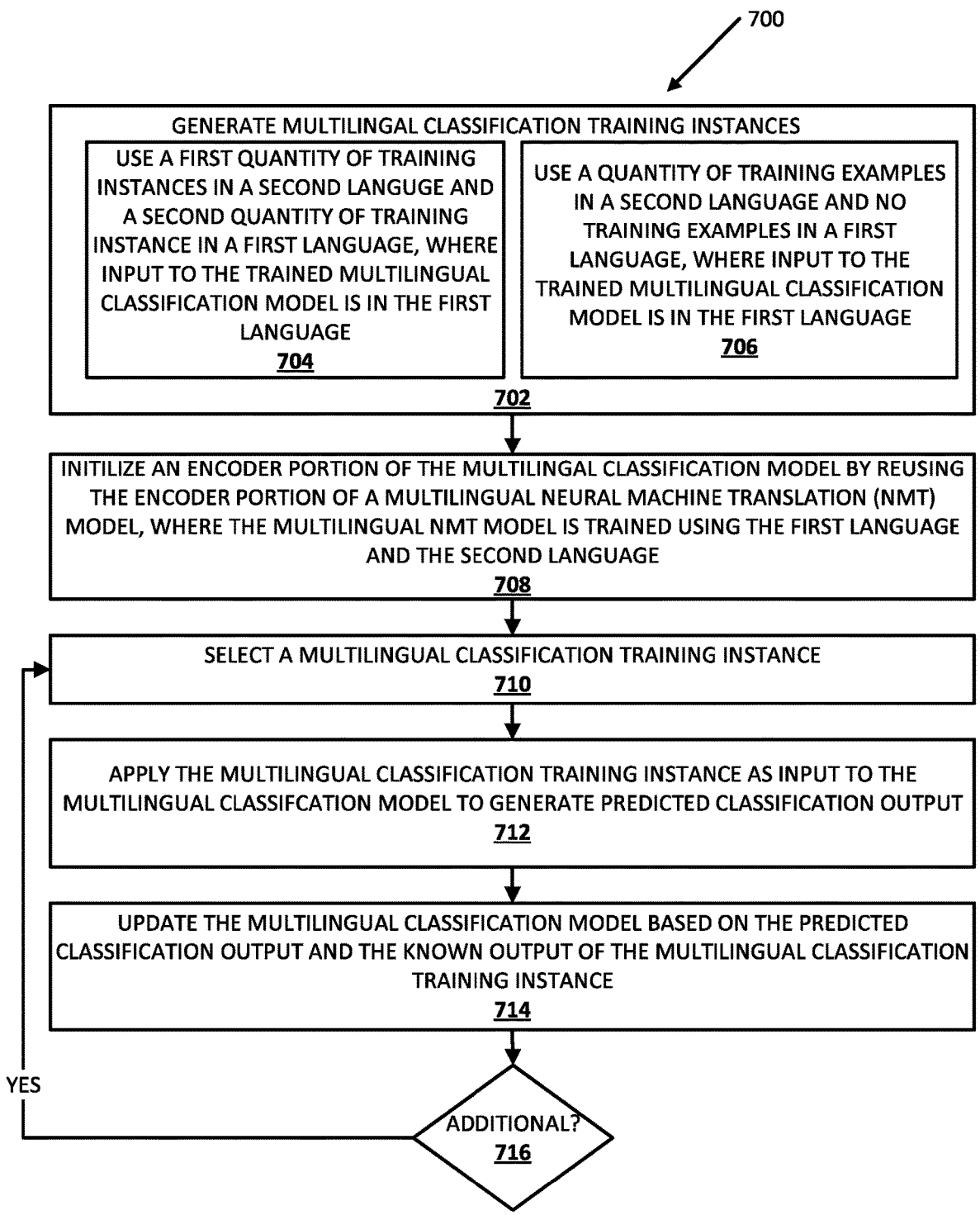
FIG. 7 is a flowchart illustrating a process of training a multilingual classification model according to implementations disclosed herein.

FIG. 7 is a flowchart illustrating an example process 700 of training a multilingual classification model according to various implementations disclosed herein. For convenience, the operations of FIG. 7 are described with reference to a system that performs the operations. This system may include various components of various computer systems, such as one or more components of client device 102. Moreover, while operations of process 700 are shown in a particular order, this is not meant to be limiting. One or more operations may be reordered, omitted, or added.

At block 702, the system generates multilingual classification training instances. Multilingual classification training instances in various implementations can be generated in a variety of ways including sub-block 704 and/or sub-block 706. At block 704, the system uses a first quantity of training instances in a second language and a second quantity of training instances in a first language, where input to the trained multilingual classification model is generated in the first language. For example, the system can utilize few-shot learning and utilized a small number of training instances in the first language compared to the number of training instances utilized in the second language to increase classification label accuracy.

At block 706, the system uses a quantity of training examples in a second language and no training examples in a first language, where input to the trained multilingual classification model is in the first language. For example, a system can utilize zero-shot learning and can classify input received in the first language using a multilingual classification model trained only in the second language by utilizing the language agnostic representation in the reused NMT encoder portion.

At block 708, the system initializes an encoder portion of the multilingual classification model by reusing the encoder portion of a multilingual NMT model, where the multilingual NMT model is trained using at least the first language and the second language.

At block 710, the system selects one of the multilingual classification training instances generated at block 702.

At block 712, the system applies the multilingual classification training instance as input to the multilingual classification model to generate predicted classification output.

At block 714, the system updates the multilingual classification model based on the predicted classification output and the known output of the multilingual classification training instance. For example, the system can determine an error based on the predicted classification output and the known output, and backpropogate the error over the neural network model to update weights of the multilingual classification model. In a variety of implementations, the multilingual classification model only updates weights in the classification classifier portion and keeps weights in the classification encoder portion unchanged (i.e., keeps the weights in the classification encoder portion frozen after initializing those weights by reusing the weights from a trained NMT encoder portion).

At block 716, the system determines whether there are one or more additional unprocessed multilingual classification training instances. If so, the system proceeds back to block 710, selects an additional multilingual classification training instance, then performs blocks 712 and 714 based on the additional unprocessed multilingual classification training instance. In some implementations, at block 716 the system may determine not to process any additional unprocessed multilingual classification training instances if one or more training criteria has been satisfied (e.g., a threshold number of epochs have occurred, a threshold duration of training has occurred, and/or all multilingual classification training instances have been processed). Although process 700 is described with respect to a non-batch learning technique, batch learning may be additionally and/or alternatively utilized. A multilingual classification model trained according to process 700 can thereafter be reused to predict, for future NL data streams, a classification label for the trained NLP task.

Figure 8:
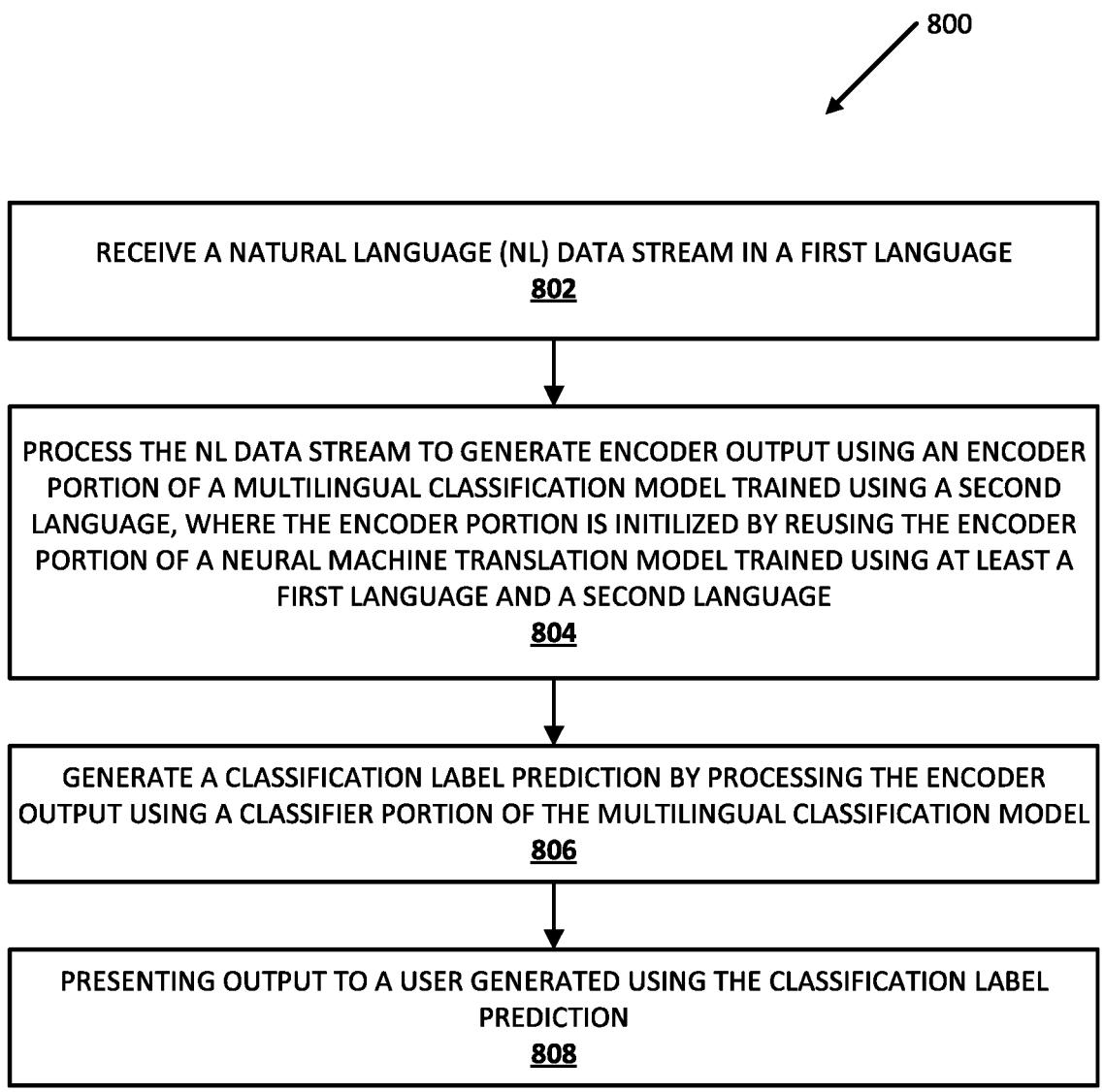
FIG. 8 is a flowchart illustrating a process of utilizing a multilingual classification model according to implementations disclosed herein.

FIG. 8 is a flowchart illustrating an example process 800 of utilizing a trained multilingual classification model to perform an NLP classification task according to various implementations disclosed herein. For convenience, the operations of FIG. 8 are described with reference to a system that performs the operations. This system may include various components of various computer systems, such as one or more components of client device 102. Moreover, while operations of process 800 are shown in a particular order, this is not meant to be limiting. One or more operations may be reordered, omitted, or added.

At block 802, the system receives a NL data stream in a first language. For example, a user can provide speech input to a client device and the client device, using a speech capture/STT/TTS module, can capture the spoken input and convert it into text form such as a NL data stream.

At block 804, the system processes the NL data stream to generate encoder output using an encoder portion of a multilingual classification model trained using a second language, where the encoder portion is initialized by reusing the encoder portion of an NMT model trained using at least the first language and the second language. In many implementations the encoder portion of an NMT model can have the same layers as the encoder portion of a classification model which can facilitate the reuse of weights in the NMT encoder portion to initialize weights in the classifier encoder portion. A classifier encoder portion utilizing recurrent network layers in accordance with many implementations is illustrated in FIG. 4.

At block 806, the system generates a classification label prediction by processing the encoder output using a classifier portion of the multilingual classification model. A classification classifier portion can include a variety of network layers including feed-forward layers, pooling layers, softmax layers, etc. to generate a classification label for input provided by the classification encoder portion. A multilingual classification classifier portion in accordance with many implementations described herein is illustrated in FIG. 5.

At block 808, the system presents output to a user generated using the classification label prediction. For example, a system can convert a classification label prediction to spoken output using a speech capture/STT/TTS module and provide the spoken output to the user via a speaker associated with the client device. Additionally or alternatively, a client device can utilize a classification label prediction to send control signals to one or more devices connected to the client device, for example combining multiple control commands to control a smart television by determining the second command has a classification label where it is entailed by the first command.

Figure 9:
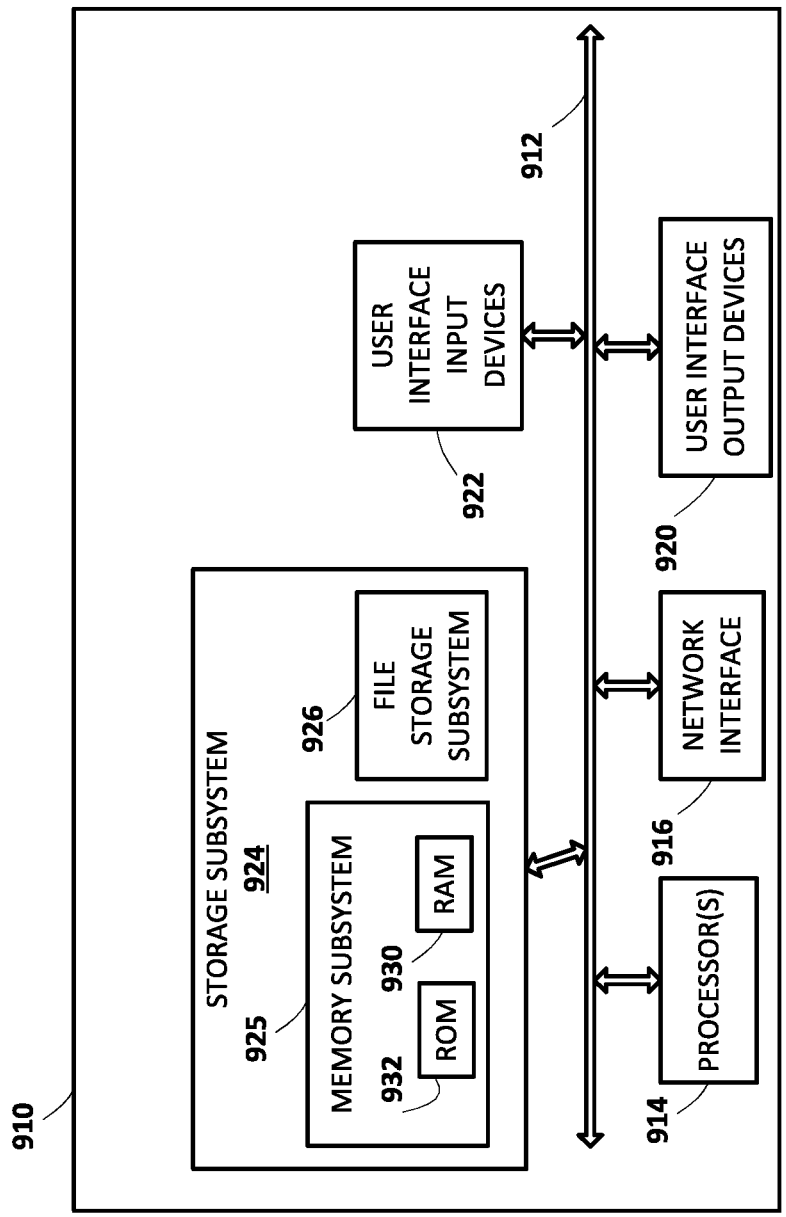
FIG. 9 illustrates an example architecture of a computing device.

FIG. 9 is a block diagram of an example computing device 910 that may optionally be utilized to perform one or more aspects of techniques described herein. In some implementations, one or more of a client computing device, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of one or more of the processes of FIGS. 6-8, as well as to implement various components depicted in FIG. 1.

These software modules are generally executed by processor 914 alone or in combination with other processors. Memory 925 used in the storage subsystem 924 can include a number of memories including a main random access memory ("RAM") 930 for storage of instructions and data during program execution and a read only memory ("ROM") 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
receiving a natural language data stream in a first language, the natural language data stream generated based on user interface input of a user via a client device;
generating a classification label prediction for the natural language data stream in the first language, wherein generating the classification label prediction comprises:
processing, using an encoder portion of a multilingual classification model, the natural language data stream to generate encoder output, and
processing, using a classifier portion of the multilingual classification model, the encoder output to generate the classification label prediction for the natural language data stream in the first language;

wherein the multilingual classification model is a trained neural network model, wherein the encoder portion is a reused multilingual neural machine translation encoder that was initially trained using a plurality of languages that include the first language and at least a second language, and wherein the multilingual classification model, including the reused multilingual neural machine translation encoder, is trained for a classification task using at least second language supervised training examples that each have respective second language training example input that is in the second language;

generating output using the classification label prediction for the natural language data stream in the first language; and causing the client device to render the output for presentation to the user.

2. The method of claim 1, wherein the multilingual classification model is trained for the classification task without using any first language supervised training example that has first language training example input that is in the first language.

3. The method of claim 1,
wherein the multilingual classification model is trained for the classification task using a first quantity of the second language supervised training examples that each have the respective second language training example input that is in the second language;
wherein the multilingual classification model is trained for the classification task using a second quantity of first language supervised training examples that each have respective first language training example input that is in the first language; and
wherein the second quantity is less than fifty percent of the first quantity.

4. The method of claim 3, wherein the second quantity is less than ten percent of the first quantity, or less than five percent of the first quantity.

5. The method of claim 1, wherein the multilingual neural machine translation encoder was trained to translate from at least the first language to at least the second language and/or from at least the second language to at least the first language.

6. The method of claim 1, wherein training the multilingual classification model using the second language supervised training examples comprises processing the second language training examples inputs using the encoder portion and the classifier portion to generate predicted outputs, and updating weights of the classifier portion based on errors determined based on the predicted outputs and based on labels for the second language supervised training examples, without updating any weights of the reused encoder portion.

7. The method of claim 1, wherein processing, using the encoder portion, the natural language data stream to generate the encoder output comprises:
processing the natural language data stream, using a bi-directional recurrent network layer of the encoder portion, to generate bi-directional recurrent output; and
processing the bi-directional recurrent output using one or more unidirectional recurrent network layers of the encoder portion, wherein the encoder output comprises one or more hidden states of a last unidirectional recurrent network layer in the one or more unidirectional recurrent network layers.

8. The method of claim 7, wherein the bi-directional recurrent network layer is a bidirectional long short-term memory (LSTM) layer or a bi-directional gated recurrent unit (GRU) layer.

9. The method of claim 1, wherein processing, using the classifier portion, the encoder output to generate the classification label prediction comprises:
processing the encoder output, using pooling layers of the classifier portion, to generate pooling output; and
processing the pooling output, using one or more softmax layers of the classifier portion, to generate the classification label prediction.

10. The method of claim 9, wherein processing the encoder output, using the pooling layers to generate the classification label prediction comprises:
processing, using a pre-pooling feed-forward layer of the pooling layers, the encoder output to generate a pre-pooling output;
processing, using a pooling layer of the pooling layers, the pre-pooling output to generate a pooling output;
processing, using a post-pooling feed-forward layer of the pooling layers, the pooling output to generate a post-pooling output; and
processing, using the one or more softmax layers, the post-pooling output to generate the classification label prediction for the natural language data stream in the first language.

11. The method of claim 1, wherein the plurality of languages includes at least the first language, the second language, and a third language.

12. The method of claim 1, wherein the user interface input is spoken input and further comprising:
generating the natural language data stream by converting the spoken input to text using a speech-to-text processor.

13. The method of claim 1, wherein the classification task is a natural language inference classification task and wherein the classification label prediction indicates whether the natural language data stream is an entailment, is neutral, or is a contradiction.

14. The method of claim 13, wherein the classification label prediction indicates that the natural language data stream is the entailment, and wherein generating the output using the classification label prediction comprises:
in response to the classification label prediction indicating that the natural language data stream is the entailment:
using an immediately preceding natural language data stream, in combination with the natural language data stream, in generating the output.

15. The method of claim 14, wherein the natural language data stream and the preceding natural language data stream are each generated based on respective spoken input.

16. The method of claim 15, further comprising:
determining, using the classification label prediction, that the natural language data stream includes a request to modify a state of a networked hardware device;
in response to determining that the natural language data stream includes the request to modify the state of the networked hardware device:
causing a control signal to be provided to the networked hardware device,
wherein the control signal causes the state of the networked hardware device to be modified;
wherein the output perceptibly indicates the modification of the state of the networked hardware device.

17. The method of claim 16, wherein the networked hardware device is selected from the group consisting of a light, a thermostat, and a networked camera.

18. A non-transitory computer-readable storage medium comprising instructions, which, when executed by one or more processors, cause the one or more processors to carry out the method of:
- receiving a natural language data stream in a first language, the natural language data stream generated based on user interface input of a user via a client device;
- generating a classification label prediction for the natural language data stream in the first language, wherein generating the classification label prediction comprises:
  - processing, using an encoder portion of a multilingual classification model, the natural language data stream to generate encoder output, and
  - processing, using a classifier portion of the multilingual classification model, the encoder output to generate the classification label prediction for the natural language data stream in the first language;
    - wherein the multilingual classification model is a trained neural network model, wherein the encoder portion is a reused multilingual neural machine translation encoder that was initially trained using a plurality of languages that include the first language and at least a second language, and wherein the multilingual classification model, including the reused multilingual neural machine translation encoder, is trained for a classification task using at least second language supervised training examples that each have respective second language training example input that is in the second language;
- generating output using the classification label prediction for the natural language data stream in the first language; and
- causing the client device to render the output for presentation to the user.

19. A system comprising one or more processors for carrying out the method of:
- receiving a natural language data stream in a first language, the natural language data stream generated based on user interface input of a user via a client device;
- generating a classification label prediction for the natural language data stream in the first language, wherein generating the classification label prediction comprises:
  - processing, using an encoder portion of a multilingual classification model, the natural language data stream to generate encoder output, and
  - processing, using a classifier portion of the multilingual classification model, the encoder output to generate the classification label prediction for the natural language data stream in the first language;
    - wherein the multilingual classification model is a trained neural network model, wherein the encoder portion is a reused multilingual neural machine translation encoder that was initially trained using a plurality of languages that include the first language and at least a second language, and wherein the multilingual classification model, including the reused multilingual neural machine translation encoder, is trained for a classification task using at least second language supervised training examples that each have respective second language training example input that is in the second language;
- generating output using the classification label prediction for the natural language data stream in the first language; and
- causing the client device to render the output for presentation to the user.

\* \* \* \* \*